Figure 1:
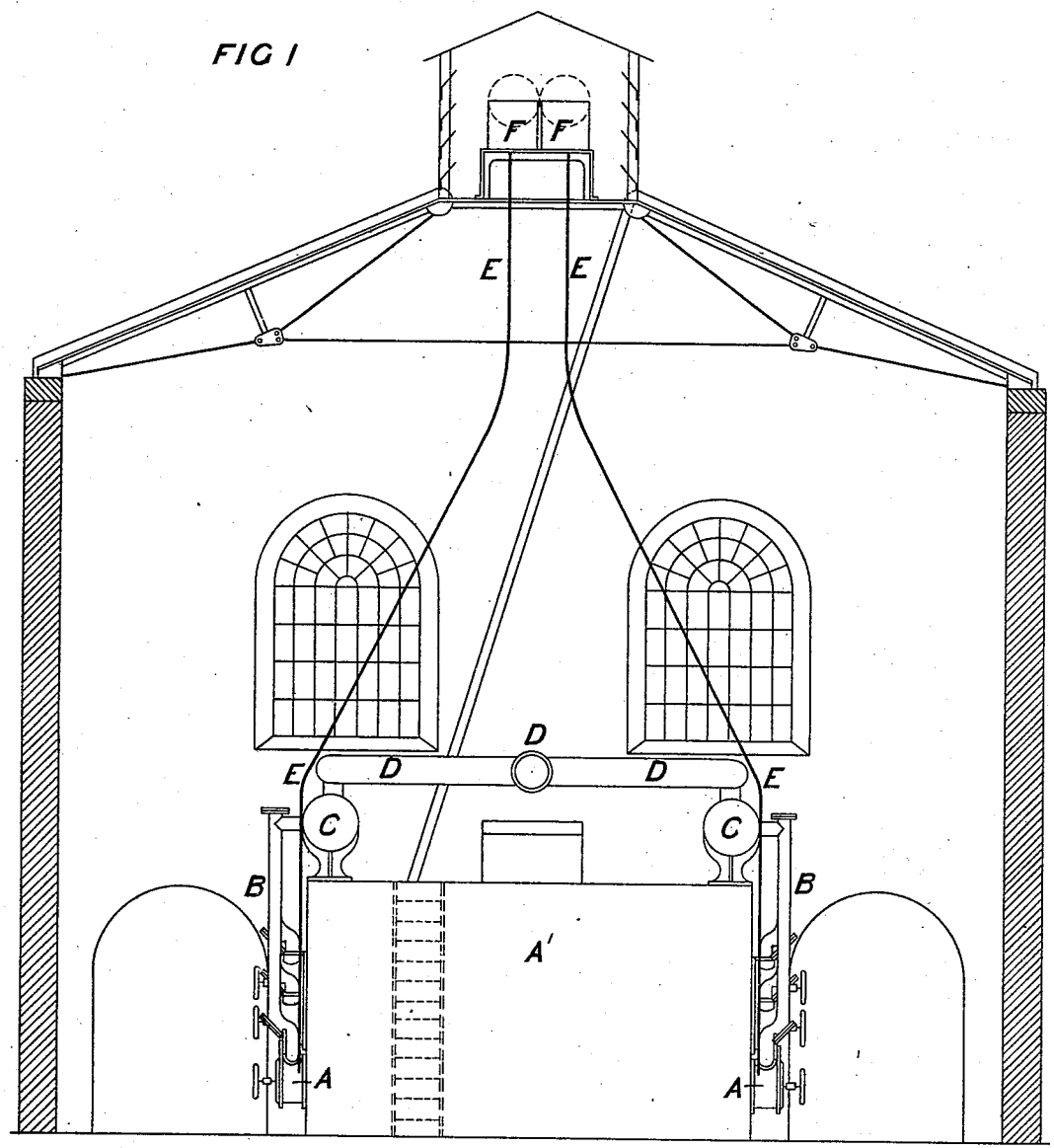

(No Model.) 6 Sheets—Sheet 1.
J. DIXON.
PROCESS OF AND APPARATUS FOR MANUFACTURING GAS.
No. 260,954. Patented July 11, 1882.

WITNESSES

INVENTOR

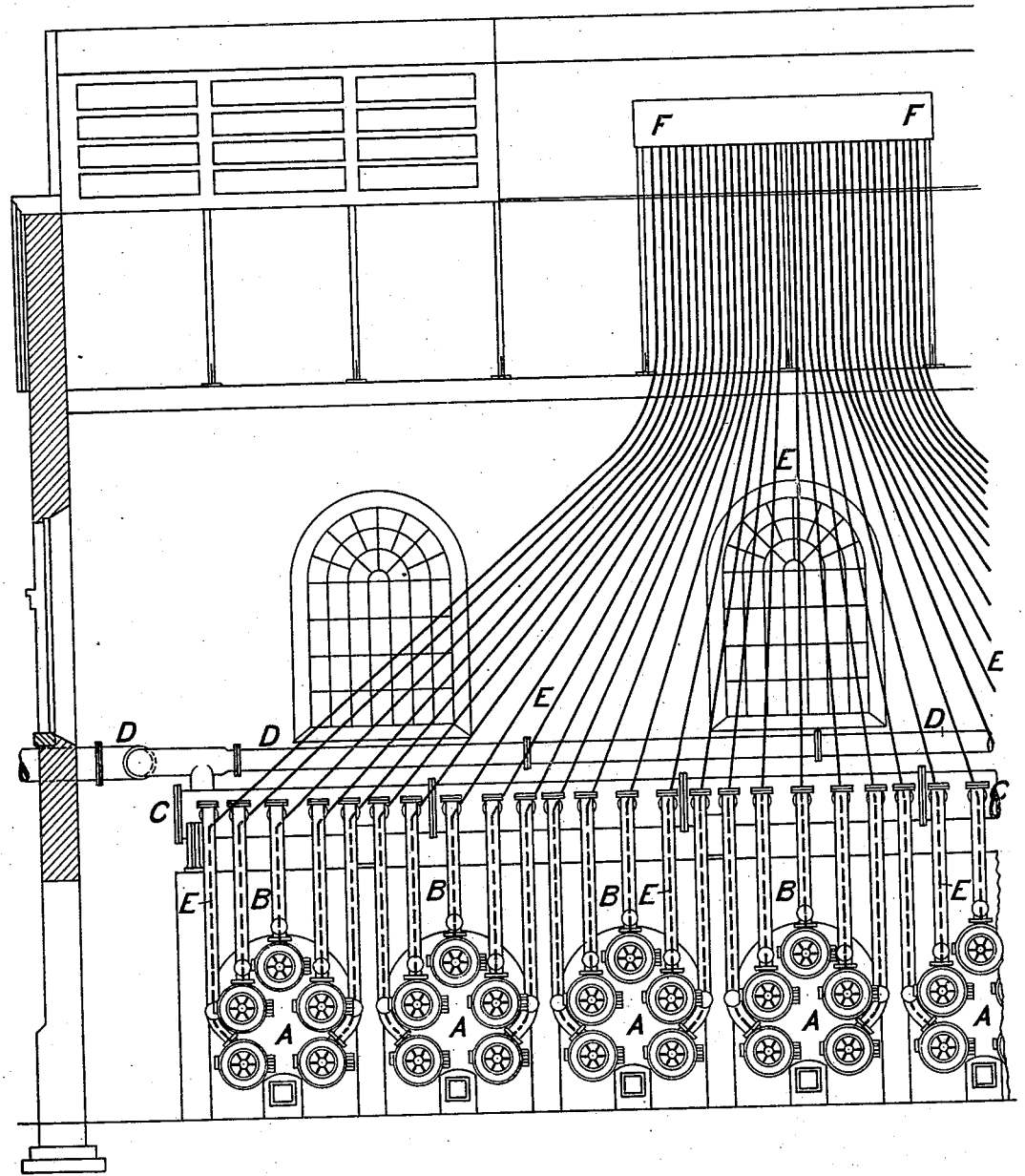

(No Model.) 6 Sheets—Sheet 3.
J. DIXON.
PROCESS OF AND APPARATUS FOR MANUFACTURING GAS.
No. 260,954. Patented July 11, 1882.
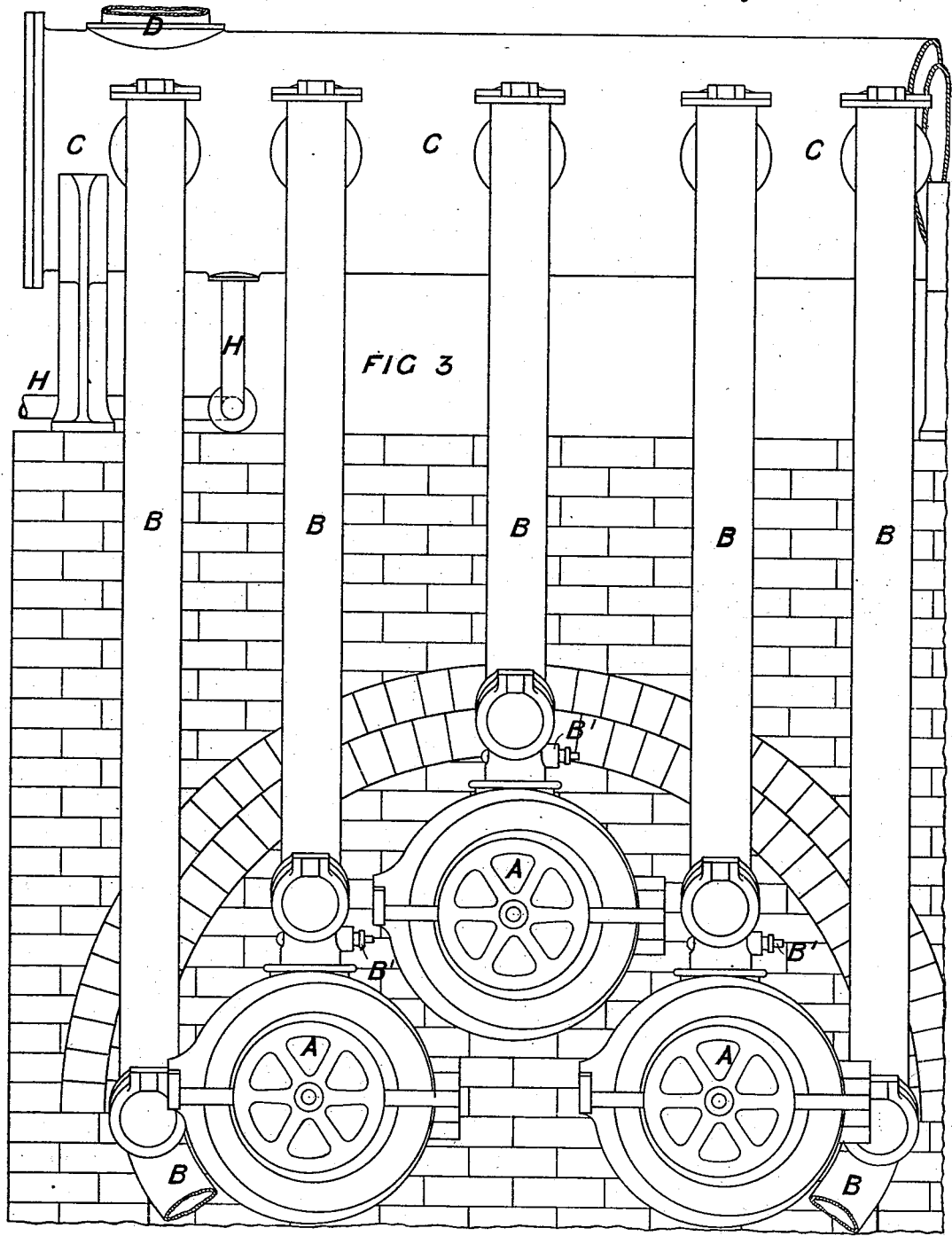
WITNESSES
INVENTOR

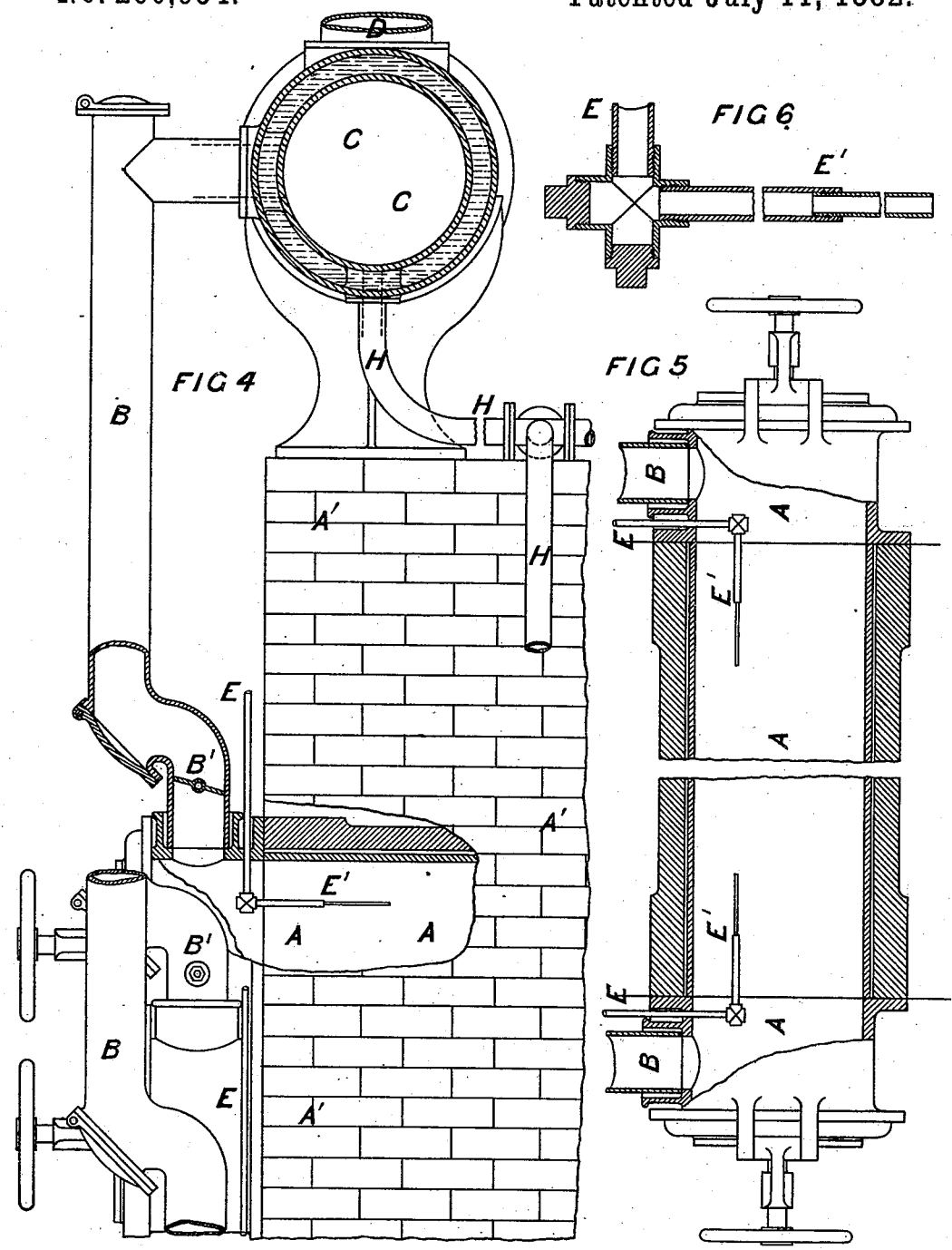

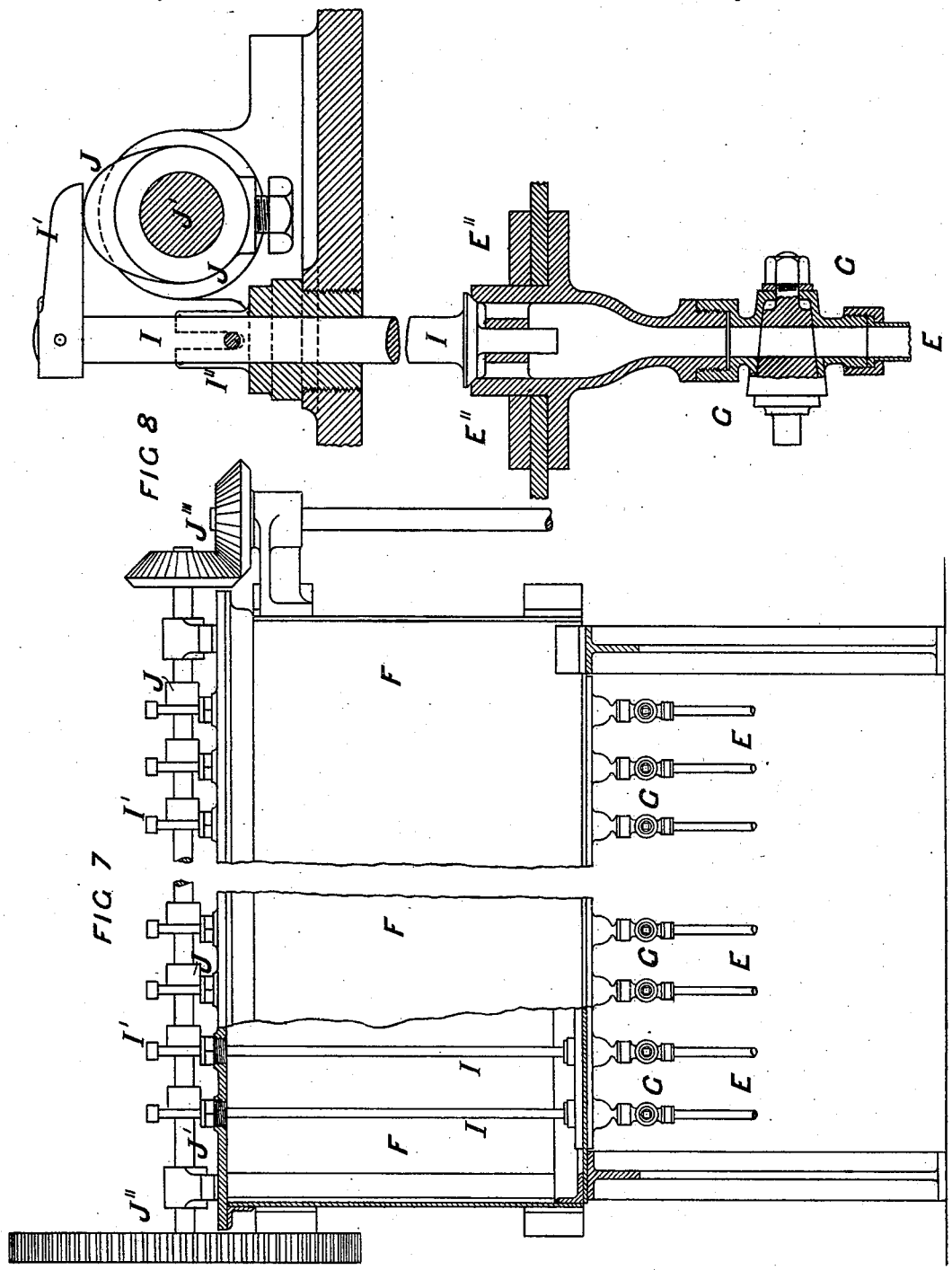

(No Model.)  6 Sheets—Sheet 6.

J. DIXON.
PROCESS OF AND APPARATUS FOR MANUFACTURING GAS.

No. 260,954. Patented July 11, 1882.

WITNESSES　　　　　　　　　　　　　INVENTOR

UNITED STATES PATENT OFFICE.

JOHN DIXON, OF RICHMOND, COLONY OF VICTORIA.

PROCESS OF AND APPARATUS FOR MANUFACTURING GAS.

SPECIFICATION forming part of Letters Patent No. 260,954, dated July 11, 1882.

Application filed August 1, 1881. (No model.) Patented in New Zealand June 1, 1881, No. 527; in England June 10, 1881, No. 2,528; in Victoria June 16, 1881, No. 3,025; in South Australia June 22, 1881, No. 181; in Tasmania June 23, 1881, No. 197; in France June 25, 1881, No. 143,648; in Cape of Good Hope July 2, 1881, No. 11,474; in Queensland July 26, 1881; in Belgium July 28, 1881, No. 55,380; in Italy August 13, 1881, Nos. 13,242 and 296; in New South Wales August 13, 1881, No. 967; in Canada August 26, 1881, No. 13,317; in Sweden September 12, 1881; in Austria-Hungary October 15, 1881, No. 36,918 and No. 20,160; in India October 24, 1881, No. 64; in Spain November 2, 1881, No. 1,785; in Argentine Republic November 19, 1881, No. 312; in Denmark November 25, 1881, No. 1,582, and in Portugal March 29, 1882, No. 723.

*To all whom it may concern:*

Be it known that I, JOHN DIXON, a subject of the Queen of Great Britain, of 266 Church Street, Richmond, in the county of Bourke, in the Colony of Victoria, at present a resident of the city of Liverpool, in the county of Lancaster, in that part of the United Kingdom of Great Britain and Ireland called England, have invented certain new and useful Improvements in the Process of and Apparatus for the Manufacture of Gas, for which I have obtained a patent in Great Britain, No. 2,528, bearing date 10th day of June, 1881; and I do hereby declare that the following is a full, clear, and exact description of the invention, which will enable others skilled in the art to which it appertains to make and use the same, reference being had to the sheets of drawings making a part of this specification.

My invention relates to the production of improved gas for illuminating purposes by the decomposition or dissolution of the component parts or constituents of certain metals or alloys of metals, earths or earthy bases, or mixtures of earths or earthy bases, acids or mixtures of acids, carbon and hydrocarbon substances, or liquids or other chemical substances, especially the salts of alkalies and alkaline earths, the dissolution of the substances being caused by heat in the manner hereinafter described.

The invention making the subject-matter of this specification is composed of two parts. The first consists of a process of producing gas by the treatment of certain chemical substances, as hereinafter described, for the purpose of producing a combination of gases which, when united in combustion, yield a white light of superior luminosity.

The second part of my said invention consists of certain apparatus used in the treatment of the chemicals to produce the illuminating-gas.

Figure 9:
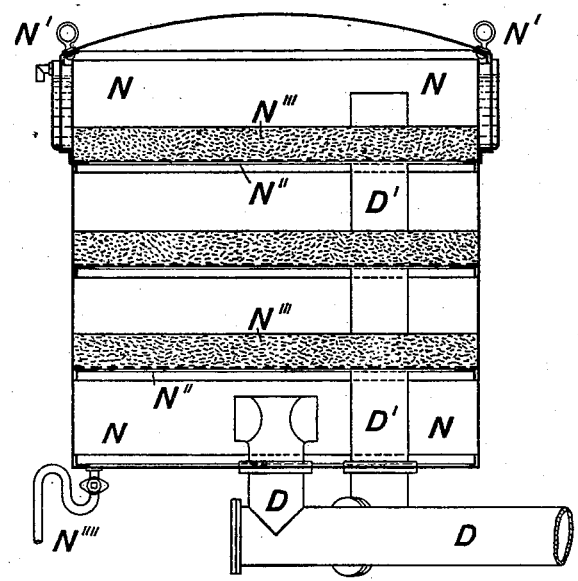
Figure 10:
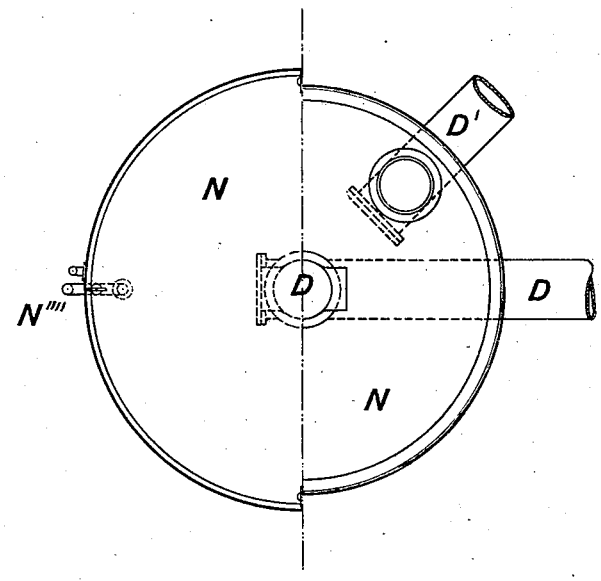

Reference being had to the accompanying drawings, Figure 1 is a sectional elevation of a retort-house fitted with appliances and apparatus suitable for carrying my invention into practice. Fig. 2 is a side sectional elevation of part of Fig. 1. Fig. 3 is a front elevation of one group of retorts, showing uptake pipes and main. Fig. 4 is a side elevation of part of Fig. 3, shown partly in section. Fig. 5 is a longitudinal section through a retort used in the practice of my invention. Fig. 6 is a longitudinal section upon an enlarged scale through the injection-nozzle shown in Fig. 5. Fig. 7 is a side elevation, partly in section, of a supply cistern and valves used in the practice of my invention. Fig. 8 is a detail of valve and gearing shown in Fig. 7. Fig. 9 is a section elevation of a purifier used in the practice of my invention. Fig. 10 is a plan of Fig. 9.

The following are the particulars of certain stock or chemical mixtures employed according to my invention in the manufacture of gas, which are referred to in the formulæ or receipts hereinafter mentioned. In combining the ingredients of which the gas is to be made it is essential that the scales, weights, and all utensils should be thoroughly and chemically clean, as the quality of the gas produced greatly depends upon the care used in preparing the mixture and in keeping the apparatus used clean, and there should be no water or moisture where the ingredients are being mixed.

After having constructed my apparatus as hereinafter described, I begin and pursue the practice of my invention as follows, the parts given below being by weight:

First. Take fine copper wire, one part; nitric acid, thirty parts; water, forty-four parts; total, seventy-five parts.

Second. Take fine cut-zinc, four parts; muriatic acid, three parts; water, five parts. Then add bismuth, two parts; mercury, two parts. In making No. 2 one half of the bismuth and one half of the mercury are to be ground together in a dry iron mortar and added after the other half of the bismuth and the other half of the mercury have been ground with the zinc.

Third. Mixtures 1 and 2, having been made as above, are mixed together and evaporated to dryness.

Fourth. Take kerosene, twenty parts; sodium, four parts, and grind together, and afterward add ten parts of kerosene and twenty-four parts of mercury, very dry, grinding the whole together in a mortar.

Fifth. Add No. 4 to No. 3 and grind the whole together.

Sixth. Take muriatic acid, four hundred and eighty parts; nitric acid, eighty parts. Dissolve in the mixed acids fine-cut zinc, two hundred and forty parts. Filter the solution through a porous substance and add to it kerosene, eight thousand parts.

Seventh. Mix Nos. 5 and 6 together and keep the mixture in a stoppered vessel, forming stock No. 1.

Eighth. Take bismuth filings, five parts; mercury, five parts. Amalgamate them and add kerosene, fifty parts. In a dry climate five grains of sodium may be added, forming stock No. 2.

Ninth. Take an iron ladle perfectly clean, warm it in a fire, and put in it a little suet to grease it, and while warm put into it mercury, five parts; sodium, five parts, forming an amalgam, which is cut into pieces about the size of canary-seed. In cutting be careful not to touch with the fingers nor allow any damp to approach it. Mix the mercury and sodium well together and add five parts more of mercury. Rub the whole thoroughly together and add two hundred and forty parts of kerosene, forming stock No. 3.

Tenth. Mix Nos. 8 and 9 (stocks 2 and 3) together and keep the compound mixtures in a glass-stoppered vessel.

In the practice of my invention I use retorts substantially such as are shown by A. They are set in a retort-bench, A', as shown by Figs. 1, 2, 3, 4, and 5 of the drawings, Fig. 5 being a detail in section of the retort. I prefer to make the retort of earthenware lined with iron. The retorts A, having been properly set, are charged to about one-third of their depth with one of the following retort-charges:

Retort-charge No. 1 is composed of the following component parts, compounded or mixed together as described, and in compounding it is important that the scales and weights used be chemically clean:

Retort-charge No. 1: Take muriatic acid, ten parts; nitric acid, five parts. Mix together and add of water, five parts; bismuth, one part; iron filings, one part; finely-cut zinc, fifteen parts. Put this mixture of acid and metals into an iron vessel and heat it until the liquids are evaporated, and when the mixture is perfectly dry add mercury, one part; sodium, one part, and grind in a mortar with suitable pestle, and add black oxide of manganese, five thousand seven hundred and sixty parts.

Retort-charge No. 2: Take copper wire, fine and clean, two parts; nitric acid, fifteen parts; water, fifteen parts; charcoal, crushed very fine, one hundred and eighty parts; quicklime, crushed very fine, or silicium, nineteen hundred and twenty parts. Mix these ingredients well together and add 894.9 parts of stock No. 1 and forty-five parts of the united stocks Nos. 2 and 3.

Retort-charge No. 2 may in some cases be substituted for retort-charge No. 1.

The retort-charges having been prepared, the retort is charged with one of them, and upon the charge in the retort there is intermittently supplied a flux mixture from a retort-supplier placed at a convenient height above the retort. These flux mixtures will be hereinafter described.

The retort-suppliers are shown by F. They are located above the retort-bench A', as shown in Figs. 1 and 2, by preference lined or faced with lead or other non-corrosive substance to resist the action of the flux mixtures.

In the preparation of the flux mixture take bismuth, three parts, dissolved by nitric acid; add antimony, one part, dissolved in hot hydrochloric acid, and sodium, one part, held in kerosene, and tin, four parts, dissolved in nitric acid, using just sufficient of the acids and kerosene to dissolve the several ingredients, and after they have been thoroughly mixed evaporate to dryness and add nine-tenths of stock No. 1 and six-sevenths of the united stocks Nos. 2 and 3, and to this add kerosene to any required extent. This flux mixture is put in the supplier F, from which it is intermittently injected into the retorts, as will be hereinafter described. The retorts and their contents should be heated to not less than a cherry-red heat to give the proper quantity and quality of gas. The best working heat for the flux mixture is 80° of Fahrenheit; if under 50°, it is very lazy, and if over 100° it is volatile. The supplier-cistern F being filled with the flux mixture, upon reference to Figs. 1, 2, 3, 4, 5, 6, 7 and 8 it will be seen that the cistern F communicates with the retorts A by means of the pipes E. In the examples shown the retorts A are double-ended, and the pipes E enter the retorts at each end, where they are provided with injecting-nozzles E', which should be coated with a fire-resisting nozzle, such as plumbago or asbestus.

Referring to Figs. 7 and 8, it will be seen that at the junction of the pipes E with the cistern F the pipes are provided with stopcocks G and with valves E''. These valves are mounted on the spindles I, which work in the guides I''. The valves E'' are actuated by the cams J on the shafts J', the cams J lifting the spindles I through the tappets I'. The shafts J' are driven by the gearing J'' J'''. The valves E'' are used to give an intermittent supply of the flux mixture from the cistern F to the retorts. The retorts are provided with uptake-pipes B, provided with throttle-valves B', and having suitable cleaning-doors, as shown. The uptake-pipes B deliver into the mains C, which are provided with water-jackets, as shown. After generation in the retort the gas is led through the mains C, answering to the hydraulic main in the ordinary gas-works. The kerosene or other vehicle is as far as possible condensed in the main C, and is led through a pipe, H, to a receiving apparatus of any suitable construction. The gas is led from the mains C through a pipe, D, to the purifier, (illustrated by Figs. 9 and 10,) consisting of a vessel, N, having a water-sealed cover, N', and purifying-trays N'', formed of wire net-work covered with a filtering medium, N''', consisting of red oxide of iron, one part; hydrate of lime, five parts, mixed well together and spread lightly over the trays. The gas from the pipes D enters the purifier at the bottom, and, passing up through the purifier, escapes into the gasometer. The purifier is fitted with a trap-pipe and cocks to drain off the condensed liquids, as shown by N''''.

In the operation of my invention the retorts A, with their charges, are brought to a cherry-red heat by gaseous fuel or coal in the retort-furnace, as will be understood. The secondary or intermittent charges, consisting of the flux mixture, are injected through the pipes E and nozzle E' into the retorts A. Gas is generated and passes through pipes B into the mains C, where it is cooled, and the liquid forming the vehicle is separated or condensed from the gas, which then passes through the pipe D, purifier N, and pipe D' to the gasometer. From thence it is led through pipes for use, like ordinary coal-gas.

Having thus described my invention, I claim and desire to secure by Letters Patent—

1. The process substantially herein described of manufacturing illuminating-gas, which process consists of first charging a retort with a mixture consisting of black oxide of manganese, muriatic acid, nitric acid, water, bismuth, iron filings, zinc, mercury, and sodium, previously united and treated as described; of then injecting intermittently upon such mixture, while in a heated state, a flux mixture consisting of bismuth dissolved in nitric acid, antimony dissolved in hydrochloric acid, sodium held in kerosene, tin dissolved in nitric acid, mixed and dried as described, and augmented by kerosene and by nine-tenths of stock No. 1, consisting of copper, muriatic acid, water, zinc, bismuth, mercury, kerosene, sodium, and nitric acid, prepared as described, and six-sevenths of the united stocks of 2 and 3, consisting of bismuth, mercury, kerosene, and sodium united and treated substantially as described.

2. The method substantially herein described of making an illuminating-gas yielding a white light, which method consists of generating and combining, in a retort of suitable construction, the gases resulting from the decomposition of the herein-described metals, salts, acids, carbons, and hydrocarbons, consisting substantially of black oxide of manganese, muriatic acid, nitric acid, bismuth, iron, zinc, mercury, antimony, copper, charcoal, sodium, and kerosene, combined and treated substantially as described.

3. The means substantially herein described of intermittently supplying a flux mixture to a previously supplied retort-charge in the manufacture of a combination of gases for the purpose of producing an illuminating-gas yielding a white light, which means consists of the combination of a retort, A, a flux-chamber, F, connecting and injecting pipes E and E', fitted with suitable valves, E'', and a shaft fitted with cams and cog-gearing, substantially as described.

JOHN DIXON.

Witnesses:
FREDERICK JOHN CHEESBROUGH,
JOHN HAMILTON REDMOND,
*Both of* 15 *Water Street, Liverpool, England.*